(12) United States Patent
Civitello et al.

(10) Patent No.: US 7,243,790 B2
(45) Date of Patent: Jul. 17, 2007

(54) MEMORY MEDIA CARRIER AND METHOD OF MANUFACTURE

(76) Inventors: John Civitello, 653 Cochise Cir., Bolingbrook, IL (US) 60440; Thomas Michael Steffl, 7361 W. Hickry Creek Dr., Frankfort, IL (US) 60423

( * ) Notice: Subject to any disclaimer, the term of this patent is extended or adjusted under 35 U.S.C. 154(b) by 39 days.

(21) Appl. No.: 11/164,581

(22) Filed: Nov. 29, 2005

(65) Prior Publication Data

US 2007/0119729 A1 May 31, 2007

(51) Int. Cl.
*B65D 85/57* (2006.01)
(52) U.S. Cl. ............... 206/308.1; 206/312; 493/84; 493/128; 493/150
(58) Field of Classification Search ............. 206/232, 206/307.1, 308.1, 309–312, 387.13, 493; 53/452, 456, 458; 281/21.1; 402/77; 493/84, 493/121, 114–116, 128, 150
See application file for complete search history.

(56) References Cited

U.S. PATENT DOCUMENTS

| | | | |
|---|---|---|---|
| 5,697,498 A * | 12/1997 | Weisburn et al. | 206/308.1 |
| 6,179,121 B1 * | 1/2001 | Ferguson et al. | 206/308.1 |
| 6,202,839 B1 * | 3/2001 | Petersen et al. | 206/308.1 |
| 6,296,112 B1 * | 10/2001 | Pettey | 206/308.1 |
| 7,070,048 B2 * | 7/2006 | Gelardi et al. | 206/308.1 |
| 7,073,664 B2 * | 7/2006 | Wang | 206/308.1 |
| 2003/0106814 A1 | 6/2003 | Gelardi et al. | |
| 2005/0103659 A1 * | 5/2005 | Gelardi et al. | 206/308.1 |
| 2005/0145514 A1 * | 7/2005 | Gelardi et al. | 206/308.1 |

* cited by examiner

*Primary Examiner*—Luan K. Bui

(57) ABSTRACT

A carrier for storing a plurality of memory devices therein and a method of manufacture for the carrier are provided. The carrier includes a jacket having a plurality of interconnected panels. A hinge member is applied to a hinge edge of containers. One of the panels of the jacket is then secured to the hinge member to mount a stack of containers within the jacket. The stack may also be secured to a second panel of the jacket.

20 Claims, 2 Drawing Sheets

MEMORY MEDIA CARRIER AND METHOD OF MANUFACTURE

BACKGROUND OF THE INVENTION

The distribution for sale to consumers of memory media for example CD's and DVD's is popular and demand is growing. Until recently, most memory media was sold and distributed in singles i.e., a single media device in a package. Such memory media typically contained movies or music. Recently, however, multi packs of memory media have grown in popularity. For example, for some long movies, multiple DVD discs were needed to contain the entire movie. Additionally, many television series are now sold on memory media having an entire season sold in a single package requiring multiple discs. Many devices have been provided for the sale of multi-pack memory media. One example of such a package is a sleeve assembly with each of the memory media being stored in a respective tray or other holder and the trays are not connected together but individually inserted into the sleeve for storage. In order to extract an appropriate memory media, the entirety of the stack is removed to determine which individual tray contains the desired memory media. A package for holding a plurality of memory media is disclosed in U.S. Patent Publication No. U.S. 2003/0106814 published Jun. 12, 2003. This patent discloses a package having a jacket comprised of a plurality of interconnected panels including a front panel, rear panel and spine panel. A stack of trays is hingedly connected together by an adhesive sided hinge member which is applied to the trays when the trays are positioned in an elongated stack or row with the strip of adhesive material being applied across the hinge edges of the trays. The joined trays are then being separated into smaller stacks by a suitable cutter. This requires an indexing mechanism to ensure that the appropriate number of and the correct trays, if the trays already contain the memory media. Each stack of trays is then secured to a single panel of a respective jacket. Each of the trays may then be individually hingedly moved about the hinge member. The hinge member is connected only to the hinge edges of the trays. This is necessitated by the method of manufacture and the associated cutting device for separating the hinge strip into segmented sections each segment securing a respective stack of trays together. One problem with the device is that the hinge member tends to fatigue over time and break rendering the package incapable of performing its organizing and exposure function of keeping a set of memory media together as a set attached in a single package. While effective for a while, the failure of the hinge member causes long term problems with the package.

There is thus a need for an improved carrier for releasably mounting individual memory media in a single package containing a plurality of media elements.

SUMMARY OF THE INVENTION

The present invention provides a carrier for storing a plurality of individual memory devices in a single package with each memory media device being individually removable. The carrier is constructed to provide individual access to a memory media device amongst a plurality of memory media devices stored therein by hingedly moving one storage tray relative to another storage tray. The carrier includes a jacket having a plurality of panels including an interior panel connected to one of the other remaining panels with the interior panel overlying and being secured to a portion of a hinge member hingedly connecting the plurality of trays together. The hinge member may be a strip of material with adhesive on one side thereof which is attached to a hinge edge of each of the trays providing a hinge joint between each of adjacent pairs of trays. The interior panel reinforces the hinge member particularly at the hinge joint between adjacent trays.

The present invention also involves the provision of a method of making a carrier for storing a plurality of memory devices wherein the method includes first forming a jacket having a plurality of panels including an interior panel. The interior panel is secured to and extends from one of the remaining panels of the jacket. Preferably the jacket is formed as an integral structure with fold lines separating each of the panels from adjacent panels. A plurality of stacks each containing a plurality of trays is provided with the stacks of trays moving through an assembly machine in end edge to end edge relationship. A strip of hinge material is applied to hinge edges of the trays in each stack with the hinge member preferably extending lengthwise along a stack of trays and then to a trailing stack of trays also along its length. The hinge member is applied to the hinge edges to hingedly connect the stack of trays together. Adjacent stacks of trays are separated from one another. The hingedly connected stack of trays is then secured to the interior panel of the jacket wherein the interior panel overlies and is secured to an exposed surface of the hinge member to secure the stack of trays within the jacket.

BRIEF DESCRIPTION OF THE DRAWINGS

Like reference numerals throughout the various Figures designate like or similar parts and structure.

DETAILED DESCRIPTION

Figure 1:
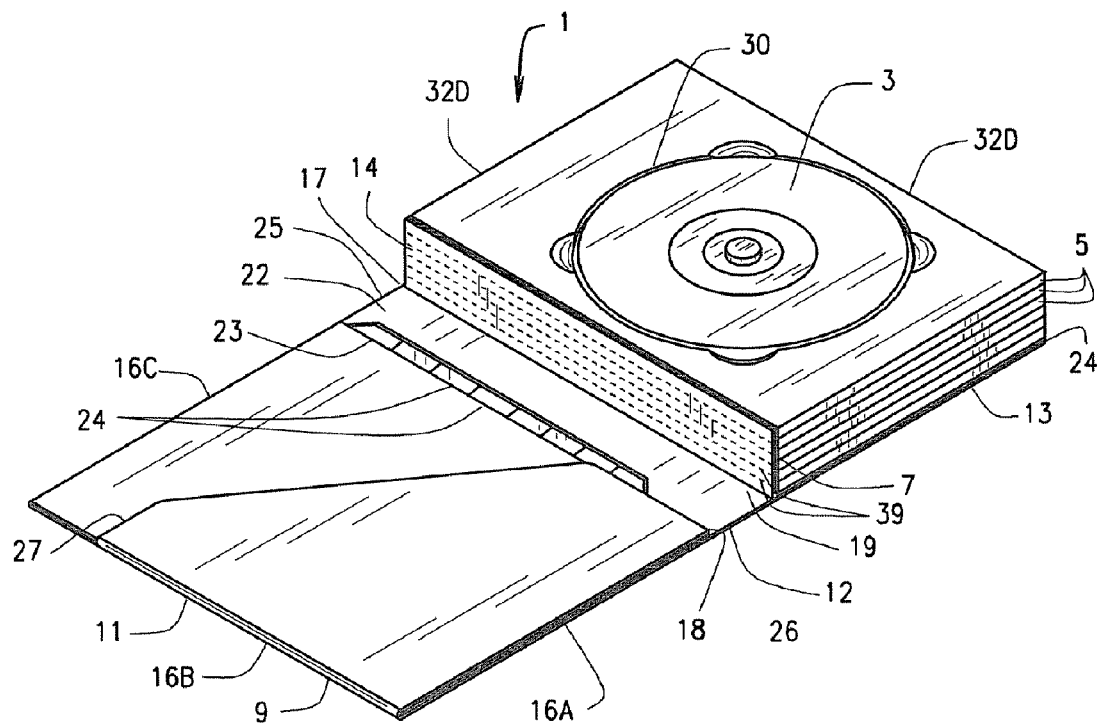
FIG. 1 is a perspective view of a carrier including a plurality of hingedly connected storage trays adapted for releasably mounting a memory device within the carrier assembly.
Figure 2:
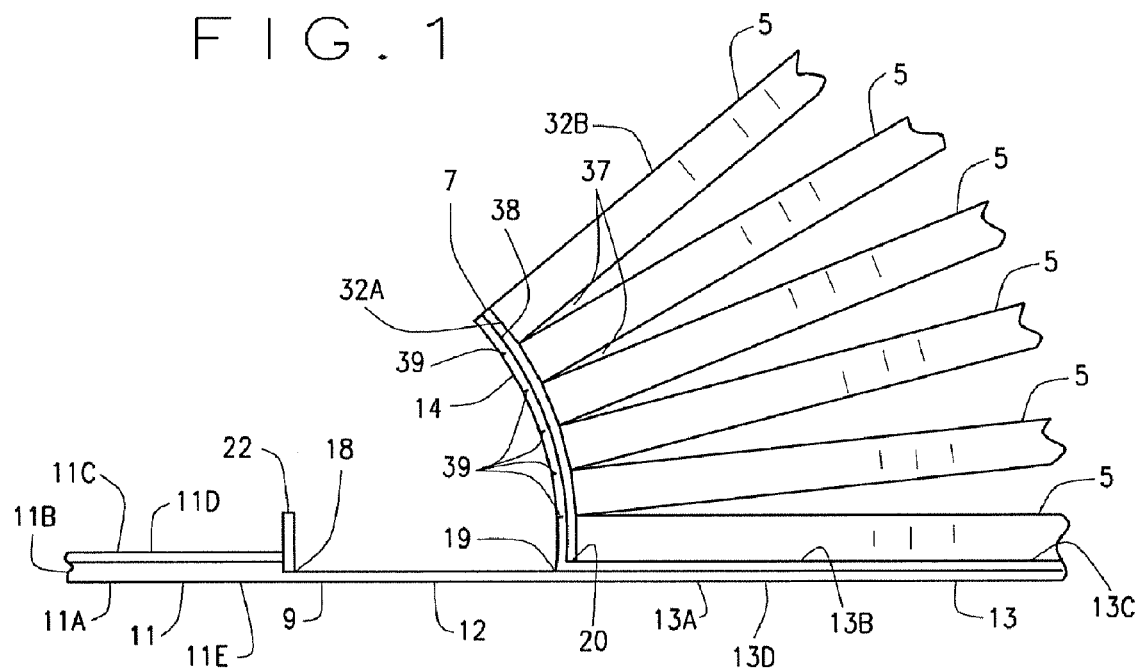
FIG. 2 is an enlarged fragmentary view of a hinge portion connecting the stack of trays together with its overlying panel member.
Figure 3:
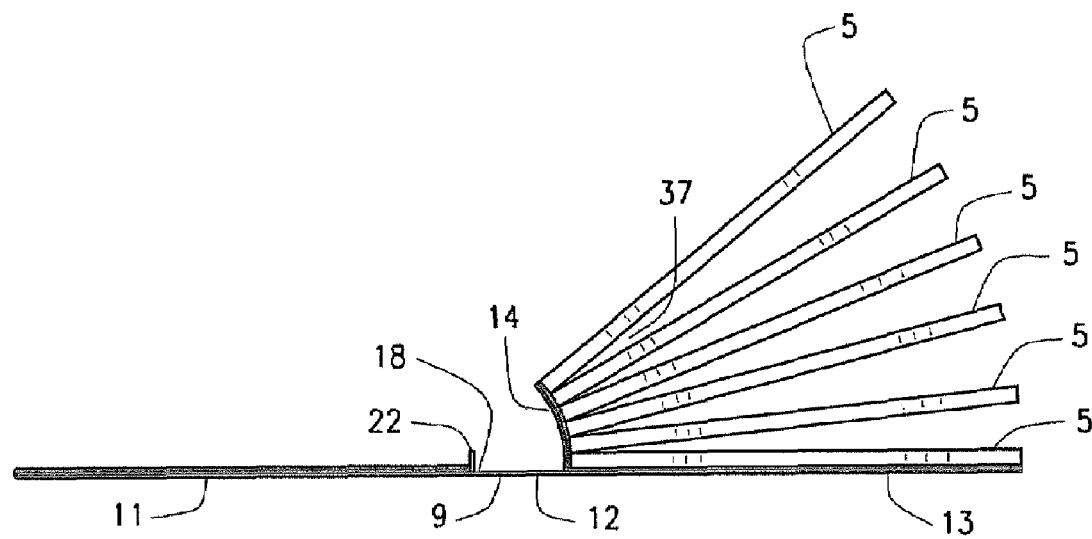
FIG. 3 is an end view of the carrier shown in an open condition.
Figure 4:
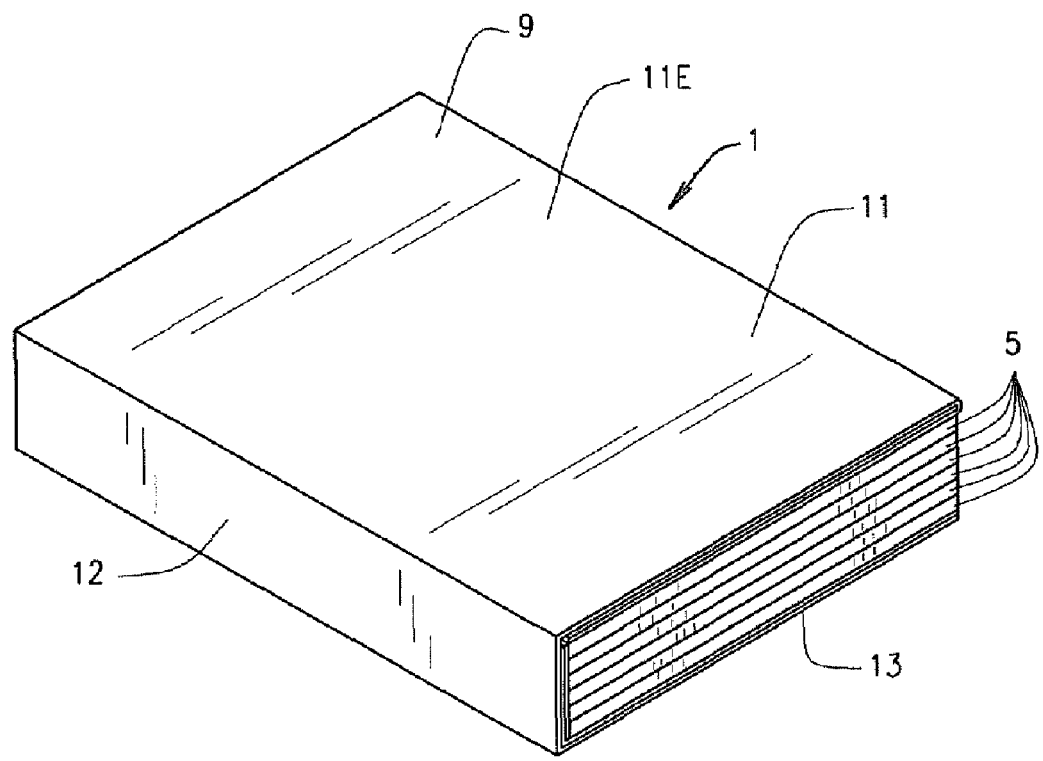
FIG. 4 is a perspective view of the carrier of FIG. 1 but shown in a closed condition.

The reference numeral 1 designates generally a carrier for use in containing for distribution and storage a plurality of memory media devices 3 such as CD's and DVD's that contain machine readable information, e.g., digital information such as music, movies, television shows and the like. A plurality of containers 5, are hindgedly attached to a hinge member 7 which is in turn secured to the jacket 9. The containers 5 are movable about gap bridging portions of the hinge member 7 allowing the stack to open up in a fan like manner to expose the media devices each within a respective container 5 for removal and/or reinsertion.

The jacket 9 is comprised of a plurality of panels that are connected to one another. In the illustrated structure, the panels include a front panel 11, spine panel 12, back panel 13 and an interior panel 14. The panels 11–14 may be formed of any suitable material as for example paperboard having a thickness on the order of about 0.01 inch to about 0.04 inch. Preferably the panels 11–14 are formed as an integral structure and may be die cut prior to formation from a single sheet of paperboard. The panels 11–14 may be single layer or multiple layers as desired. In the illustrated structure, the front panel 11 is a multi layer panel preferably formed by having portions 11A, 11B, 11C secured to one another at interengaging faces and formed by folding at an outer edges 16A, 16B, 16C and having inner and outer surfaces 11D, 11E. Likewise, the back panel 13 may be multi-layered with the layers 13A, 13B being secured at interengaging faces and connected at edge 17 and providing inner and outer surfaces 13C, 13D. The spine panel 12 is connected to each of the front panel 11 and back panel 13 at the fold lines 18, 19. The interior panel 14 is preferably an extension of one of the panels 11–13 and is shown as an extension of the panel 13 joined together at the fold line 20. Another panel 22 may be provided extending from a portion of the front panel 11 to provide a removable tab or tabs 21 for such things as proof of purchase, discounts and the like. The panel 22 is joined to the front panel 11 at fold line 23. While the interior panel 14 is shown as connected to the back panel 13 along an interior fold line 20, it is to be understood that it may also be connected to a top edge or outside edge of any of the panels that provide for different folding arrangements as desired. For example, the interior panel 14 may be connected to an outer edge 24, a top or bottom edge 25, 26 of the back panel 13 or spine panel can be mounted to the front panel 11.

A pocket 27 may be provided between portions 11B, 11C. The containers 5 for DVD's and CD type media devices are typically in the form of a molded tray and are made of a polymeric material, e.g., styrene or polystyrene and may be clear. The containers 5 have a recess 30 for receipt therein of a respective media device 3 which may be mounted on a post 31 located in the recess 30 and projecting from a bottom surface thereof into the recess. The containers 5 have a thickness and an outer perimeter. The outer perimeter is defined by a plurality of side or end edges 32A–D having height substantially the same as the thickness of the container 5. One of the edges 32 is utilized as a hinge edge for the securement of the hinge member 7 thereto. The containers 5 are in a stack having the hinge edges which is noted as 32A in the drawings, aligned and define a plane. When the carrier 5 is folded to a closed condition the hinge member 7 is secured to the hinge edges 32A and extends between the edges 32B, C which extend from opposite ends of the hinge edge 32A. The edge 32D is a distal edge while the hinge edge 32A is a proximal edge. Preferably, the corresponding edges 32A–D of each container 5 also define a plane and are aligned as are the edges 32A. That is, the edges 32B are aligned, the edges 32C are aligned and the edges 32D are aligned.

The hinge member 7 is preferably a polymeric strip or tape having adhesive preferably on one face 35 thereof. By having adhesive pre-applied to the hinge member 7, the installation of the hinge member adhesively to the edges 32A of containers 5 can be facilitated and preclude, adhesive from flowing between the containers possibly interfering with their hinged movement relative to one another. However, it is to be understood that adhesive could be applied to the edges 32A and a flexible hinge member 7 be adhesively secured thereto. The hinge member 7 may be made of polyethylene, polypropylene or any other suitable flexible polymeric material. Other materials can be used to construct the hinge member 7 including paper and composites depending upon the strength needed and the number of flex cycles anticipated for the hinge member 7. The hinge member 7 bridges the gaps 37 between adjacent containers 5 forming a hinged joint between each of the adjacent containers 5. In a preferred embodiment, the hinge member 7 has adhesive applied to both the face 35 and its opposing face 36. However, it is to be understood that adhesive could be applied to one face 38 of the interior panel 14 or to face 36 of the hinge prior to its securement to the face 38 of the binder panel 14. The interior panel 14 is then used to at least partially mount a stack container 5 in the jacket 9 and also serves the function of reinforcing at least a portion of the hinge 7. While the interior panel 14 is shown as being secured to each of the edges 32A of all the containers 5 to bind them together, it may be secured to one or more as desired. However, it is preferred that the interior panel 14 be secured to all of the container 5 at least to the extent that it bridges the gaps between the containers 5 to reinforce the hinge joints 39 between the containers 5. In a preferred embodiment an element is provided to assist or bias the panel 14 to bend or lunge at the gaps 37. Lines of perforations 39 can be provided at the gaps 37. The perforations 39 may go through the panel 14 or partially through the panel 14. A crease line may be provided with or instead of the perforations 39. Score lines may also be provided.

In a preferred embodiment, the stack of containers 5 is secured to a plurality of panels with one of the panels preferably being the panel 14. As shown, the stack of containers 5 is also secured to the back panel 13 as with adhesive 41. Other forms of attachment may be used if desired. As shown, the adhesive 41 is applied to a face 42 of the panel 13 with the adhesive being positioned to adhere to portions of a container 5 abutting the face 42. Spot depositing of the adhesive 41 is preferred to reduce the amount of adhesive used for securement. A hot melt adhesive can be used.

The present invention also includes a method of making a carrier for storing a plurality of memory devices. In a preferred embodiment, a plurality of sets of stacks of containers 5 are formed. The appropriate number of carriers is positioned in each stack and the stacks are arranged in end to end relationship along a conveyor. The hinge edges 32A preferably are positioned facing upwardly where otherwise exposed for the application of the hinged member 37 thereto. Preferably the hinge member 7 is formed from an elongate strip of material which may be cut into proper length segments either before application to the hinge edges 32A or after application. The plurality of stacks of trays are positioned in end edge to end edge relationship and preferably abut one another when the hinge member 7 is applied in the form of a continuous strip and cut after application to the hinge edges 32A. A completed jacket is then positioned where the panel 14 overlies the hinge member 7 and is then applied, to its respective hinge member 7. The adhesive on the opposite faces of the hinge member 7 is preferably a pressure sensitive adhesive wherein securement is effected by applying force to the panel 14 which will help secure the panel 14 to the hinge member and the hinge member to the hinge edges 32A of the containers 5. The jackets are extracted from a magazine storing a plurality of jackets. Prior to depositing in the storage magazine, the jackets are suitably formed. The material comprising the jackets 9 are suitably cut as for example die cutting, laser cutting or the like. The various panels are then formed by forming the various crease lines therebetween. In the event of a multi layer panel for example the front panel 11 and the back panel 13, they are folded along the edges for example the edges 16A–C and 17, wherein the faces are adhesively secured together as for example with pressure sensitive adhesive or hot melt adhesive. Each of the panels 11, 12, 13 and 14 have generally opposite surfaces. Some of the surfaces for example the surfaces 11D and 13C will be on the interior of the jacket 9 when in a closed condition and the surfaces 11E and 13D will be on the exterior of the jacket when the jacket is in a closed condition. The surfaces may be provided with graphic elements for example the name of the set advertising graphics, promotional graphics, and marketing graphics as is well known in the art. The graphics will be printed on the panels at any suitable time during the formation of the jacket which can be either after forming the multi layer panels or before folding the cut blank. The sequence of attaching the stack to the two panels may be in the order of securing first to the panel 14 and then the back panel 13 or the back panel 13 and then the binder panel 14 depending upon the particular construction of the assembly line. The panels 11, 12, 13, 14 and 22 are preferably formed as an integral structure from a cut blank. Simple folding of the blank to form the jacket 9 may be easily accomplished.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A carrier for storing a plurality of individual memory devices, said carrier comprising:
   a jacket having a plurality of panels, including a front panel, a back panel, a spine panel and a binder panel, said front and back panels being connected to the spine panel and the binder panel being connected to at least one of the front, back and spine panels;
   a plurality of containers each having a hinge edge;
   a hinge member secured to each of the containers adjacent the hinge edge of the containers hingedly joining the containers in a stack, said stack of hingedly attached containers being attached to the binder panel wherein one surface of the binder panel overlying and being secured to an exposed surface of the hinge member at least partially mounting the stack to the jacket.

2. A carrier as set forth in claim 1 wherein the binder panel having a proximal edge joined to one of said back panel and spine panel adjacent an edge of the spine panel.

3. A carrier as set forth in claim 1 wherein the back panel, spine panel, binder panel and front panel are integral with one another.

4. A carrier as set forth in claim 3 wherein the jacket is formed of paperboard.

5. A carrier as set forth in claim 1 wherein the container stack being secured to at least two of said panels including said binder panel.

6. A carrier as set forth in claim 1 wherein the binder panel bridges hinged joints in the hinge member between adjacent containers.

7. The carrier of claim 6 wherein the hinge member including a strip of material with adhesive applied on opposite faces of the strip prior to attachment to the containers.

8. The carrier as set forth in claim 6 wherein the container including trays having recesses for receipt of memory devices therein.

9. The carrier as set forth in claim 8 including a memory device removably mounted in a respective recess, said media device including at least one of a DVD or CD.

10. The carrier as set forth in claim 1 wherein the binder panel includes a biasing element between adjacent trays and extending along at least a substantial portion of a gap between adjacent containers.

11. The carrier as set forth in claim 10 wherein the biasing elements includes a perforate line.

12. The carrier as set forth in claim 11 wherein the perforate lines includes a plurality of spaced perforations extending only partly through the binder panel.

13. The carrier as set forth in claim 10 wherein the biasing element includes a score line.

14. A method of making a carrier for storing a plurality of memory devices, said method comprising:
    forming a jacket with a plurality of panels including a front panel, back panel, spine panel and binder panel, said binder panel having a proximal edge attached to at least one of the front, back and spine panels;
    forming a stack of plurality of containers, each container having a hinge edge;
    aligning the hinge edges in a said stack;
    applying a hinge member to the hinge edges of the containers in said stack to hingedly connect the containers in the stack together to form a hinged assembly; and
    securing the hinge assembly to the binder panel with the binder panel overlying and being secured to an exposed surface of the hinge member.

15. The method of claim 14 wherein the stacks are positioned in end edge to end edge relationship prior to application of the hinge member.

16. The method of claim 15 wherein the hinge member is formed from a strip of material which is applied to the hinge edges and then cut between abutting stacks of containers.

17. The method of claim 16 wherein the strip of material is a double sided adhesive strip.

18. The method of claim 14 wherein the binder panel proximal edge is positioned adjacent and edge of the spine panel.

19. The method of claim 14 wherein the stack is secured to at least two said panels including said binder panel.

20. The method of claim 19 wherein the panels are integral with one another.

* * * * *